(12) United States Patent
Saidi

(10) Patent No.: US 11,537,430 B1
(45) Date of Patent: *Dec. 27, 2022

(54) WAIT OPTIMIZER FOR RECORDING AN ORDER OF FIRST ENTRY INTO A WAIT MODE BY A VIRTUAL CENTRAL PROCESSING UNIT

(71) Applicant: Amazon Technologies, Inc., Seattle, WA (US)

(72) Inventor: Ali Ghassan Saidi, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 205 days.

This patent is subject to a terminal disclaimer.

(21) Appl. No.: 16/783,935

(22) Filed: Feb. 6, 2020

Related U.S. Application Data

(63) Continuation of application No. 15/719,352, filed on Sep. 28, 2017, now Pat. No. 10,592,281.

(51) Int. Cl.
*G06F 9/48* (2006.01)
*G06F 9/455* (2018.01)

(52) U.S. Cl.
CPC ........ *G06F 9/4881* (2013.01); *G06F 9/45558* (2013.01); *G06F 2009/45575* (2013.01)

(58) Field of Classification Search
None
See application file for complete search history.

(56) References Cited

U.S. PATENT DOCUMENTS

| | | | |
|---|---|---|---|
| 5,345,489 A | 9/1994 | Saitoh | |
| 6,782,440 B2 | 8/2004 | Miller | |
| 6,823,511 B1 | 11/2004 | McKenney et al. | |
| 6,880,021 B2 | 4/2005 | Easton et al. | |
| 7,035,870 B2 | 4/2006 | McGuire et al. | |
| 7,117,481 B1 | 10/2006 | Agesen et al. | |
| 7,290,105 B1 * | 10/2007 | Jeter, Jr | G06F 9/526 |
| | | | 711/150 |
| 7,346,720 B2 | 3/2008 | Fachan | |
| 7,428,732 B2 | 9/2008 | Sandri et al. | |
| 7,765,543 B1 | 7/2010 | Weissman et al. | |
| 8,713,563 B2 | 4/2014 | Kondoh et al. | |
| 8,751,715 B1 | 6/2014 | Shubel | |

(Continued)

OTHER PUBLICATIONS

U.S. Appl. No. 15/719,352, "Non-Final Office Action", dated Jun. 13, 2019, 33 pages.

(Continued)

*Primary Examiner* — Meng Al T AN
*Assistant Examiner* — Zujia Xu
(74) *Attorney, Agent, or Firm* — Weaver Austin Villeneuve & Sampson LLP

(57) ABSTRACT

A wait optimizer circuit can be coupled to a processor to monitor an entry of a virtual CPU (vCPU) into a wait mode to acquire a ticket lock. The wait optimizer can introduce an amount of delay, while the vCPU is in the wait mode, with an assumption that the spinlock may be resolved before sending a wake up signal to the processor for rescheduling. The wait optimizer can also record a time stamp only for a first entry of the vCPU from a plurality of entries into the wait mode within a window of time. The time stamps for vCPUs contending for the same ticket lock can be used by a hypervisor executing on the processor for rescheduling the vCPUs.

20 Claims, 8 Drawing Sheets

(56) References Cited

U.S. PATENT DOCUMENTS

| | | | |
|---|---|---|---|
| 9,274,823 B1 | 3/2016 | Koryakin et al. | |
| 9,411,630 B1 | 8/2016 | Adams et al. | |
| 9,582,295 B2 | 2/2017 | Gainey, Jr. et al. | |
| 9,965,412 B2 | 5/2018 | Liu et al. | |
| 10,002,161 B2 | 6/2018 | Balko et al. | |
| 10,169,107 B2 | 1/2019 | Greco | |
| 10,387,332 B1 | 8/2019 | Metcalf et al. | |
| 10,423,451 B2 | 9/2019 | Fahrig et al. | |
| 10,521,357 B1 | 12/2019 | Ramey et al. | |
| 10,592,281 B1 | 3/2020 | Saidi | |
| 2002/0046334 A1 | 4/2002 | Wah Chan et al. | |
| 2004/0230972 A1 | 11/2004 | Donovan et al. | |
| 2006/0075061 A1 | 4/2006 | Garcia | |
| 2006/0130062 A1 | 6/2006 | Burdick et al. | |
| 2007/0050567 A1 | 3/2007 | Murakami | |
| 2008/0184249 A1 | 7/2008 | Adams et al. | |
| 2008/0250422 A1 | 10/2008 | Lewis | |
| 2009/0025006 A1 | 1/2009 | Waldspurger | |
| 2009/0049220 A1 | 2/2009 | Conti et al. | |
| 2009/0157936 A1 | 6/2009 | Goss et al. | |
| 2009/0177932 A1 | 7/2009 | Abts et al. | |
| 2010/0011360 A1 | 1/2010 | Fontenot et al. | |
| 2010/0031254 A1 | 2/2010 | Chin et al. | |
| 2011/0087815 A1 | 4/2011 | Kruglick | |
| 2011/0099551 A1 | 4/2011 | Fahrig et al. | |
| 2011/0119667 A1* | 5/2011 | Srinivasan | G06F 11/3055 718/1 |
| 2011/0213992 A1 | 9/2011 | Satsangi et al. | |
| 2012/0047220 A1 | 2/2012 | Usui | |
| 2013/0152082 A1* | 6/2013 | Ahrens | G06F 11/0712 718/1 |
| 2013/0290585 A1 | 10/2013 | Marietta et al. | |
| 2013/0298136 A1* | 11/2013 | Dakemoto | G06F 9/50 718/104 |
| 2014/0059333 A1 | 2/2014 | Dixon et al. | |
| 2014/0149979 A1 | 5/2014 | Tsirkin et al. | |
| 2015/0033228 A1 | 1/2015 | Lee et al. | |
| 2015/0121377 A1 | 4/2015 | Zang et al. | |
| 2016/0057165 A1 | 2/2016 | Thakar et al. | |
| 2016/0092320 A1 | 3/2016 | Baca | |
| 2016/0359638 A1 | 12/2016 | Shi et al. | |
| 2016/0378168 A1* | 12/2016 | Branover | G06F 1/3243 713/323 |
| 2017/0286278 A1 | 10/2017 | Thomas et al. | |
| 2018/0032588 A1 | 2/2018 | Nor et al. | |
| 2018/0060103 A1 | 3/2018 | Tsirkin | |
| 2018/0095783 A1* | 4/2018 | Lillibridge | G06F 9/485 |
| 2018/0173580 A1 | 6/2018 | Pavlas et al. | |

OTHER PUBLICATIONS

U.S. Appl. No. 15/719,352, "Notice of Allowance", dated Nov. 6, 2019, 18 pages.

U.S. Appl. No. 15/622,490, "Spinlock Notifications." filed Jun. 14, 2017.

Chakraborty, K., et al., "Supporting Overcommitted Virtual Machines through Hardware Spin Detection", IEEE Transactions on Parallel and Distributed Systems, vol. 23, No. 2, pp. 353-366, Feb. 2012 [doi: 10.1109/TPDS.2011.143].

Theurer, Andrew, "KVM and Big VMs", KVM Forum 2012, https://www.linux-kvm.org/images/5/55/2012-forum-Andrew-Theurer-Big-SMP-VMs.pdf [retrieved on Jun. 19, 2017].

* cited by examiner

FIG. 3A

| NEXT 300a | OWNER 300b |
|---|---|

| TICKET LOCK 300 | vCPU1 304a | vCPU2 304b | vCPU3 304c | vCPU4 304d |
|---|---|---|---|---|
| NEXT = 0  OWNER = 0 |   |   |   |   |
| NEXT = 1  OWNER = 0 | 0 |   |   |   |
| NEXT = 2  OWNER = 0 | 0 |   |   |   |
| NEXT = 3  OWNER = 0 | 0 |   | 1 |   |
| NEXT = 4  OWNER = 0 | 0 | 3 | 1 | 2 |
| NEXT = 4  OWNER = 1 |   | 3 | 1 | 2 |
| NEXT = 4  OWNER = 2 |   | 3 |   | 2 |
| NEXT = 4  OWNER = 2 |   | 3 |   | 2 |
| NEXT = 4  OWNER = 3 |   |   |   | 2 |

302a
302b
302c
302d
302e
302f
302g
302h
302i

WAIT OPTIMIZER FOR RECORDING AN ORDER OF FIRST ENTRY INTO A WAIT MODE BY A VIRTUAL CENTRAL PROCESSING UNIT

CROSS-REFERENCE TO RELATED APPLICATIONS

This application is a continuation of U.S. patent application Ser. No. 15/719,352, filed Sep. 28, 2017, issued as U.S. Pat. No. 10,592,281 on Mar. 17, 2020, and titled "WAIT OPTIMIZER FOR RECORDING AN ORDER OF FIRST ENTRY INTO A WAIT MODE BY A VIRTUAL CENTRAL PROCESSING UNIT," the content of which is herein incorporated by reference in its entirety for all purposes.

BACKGROUND

In a virtualized computer system, a lock may be used to ensure that only one virtual central processing unit (vCPU) can access a critical resource, such as a memory, at a time. A spinlock in the virtualized computer system is a lock that can cause a vCPU trying to acquire the resource to wait in a loop ("spin") while repeatedly checking if the lock is available. In a non-virtualized system, a spinlock may generally be resolved quickly because in most instances the lock can be released after a short time period. However, a virtualized computing system can suffer severe performance degradation as a result of spinlock operations because a virtual CPU that holds a lock may be de-scheduled from execution for a long period of time.

BRIEF DESCRIPTION OF THE DRAWINGS

Various embodiments in accordance with the present disclosure will be described with reference to the drawings, in which:

FIG. 3A illustrates an example of a ticket lock in one embodiment;

FIG. 3B illustrates a table showing an order of ticket lock acquisition by a set of virtual central processing units (vCPUs), in one embodiment;

DETAILED DESCRIPTION

Figure 1:
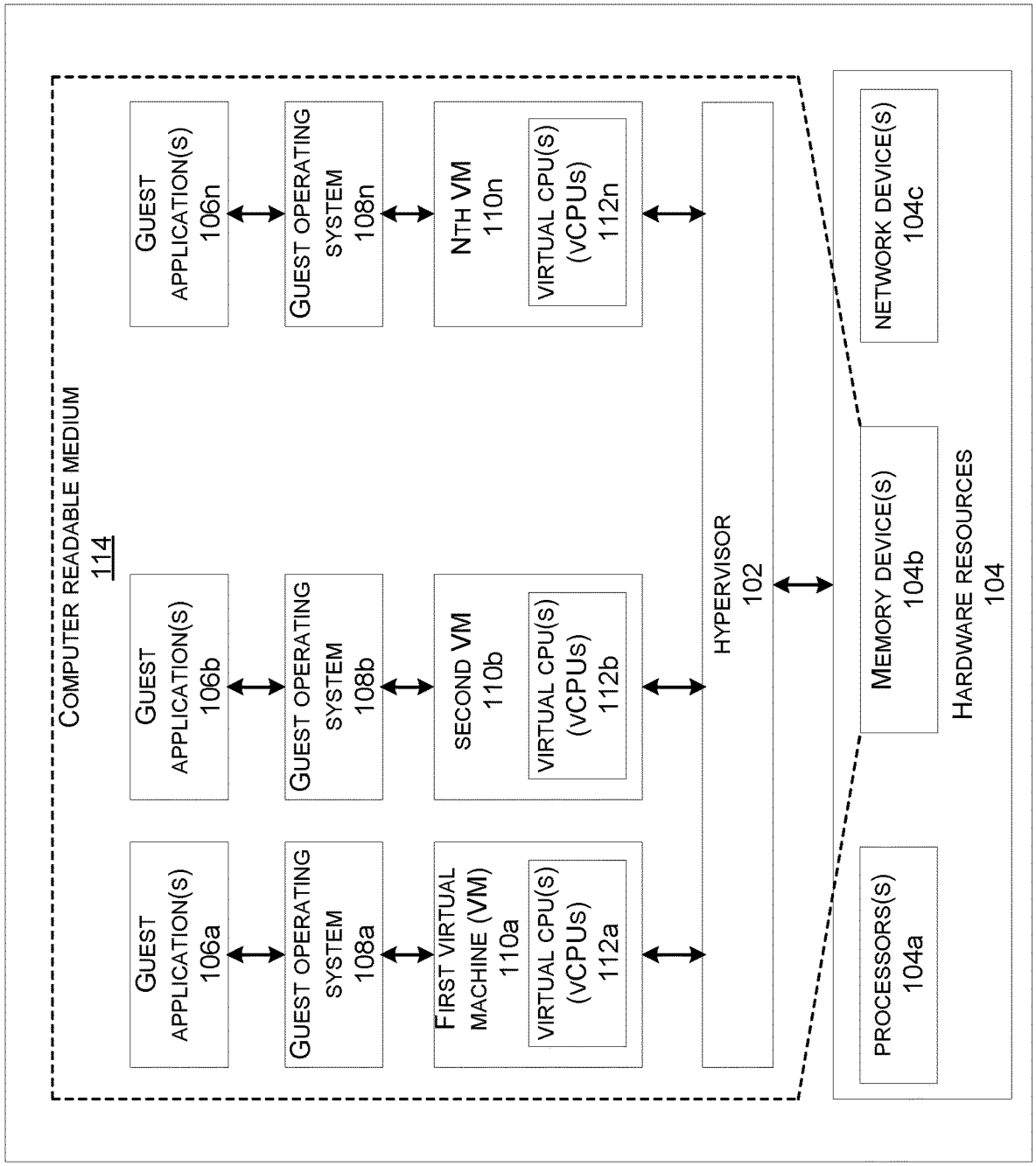
FIG. 1 is a simplified block diagram of an example virtualized computer system, according to certain aspects of the disclosed technologies.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

In a computer system, one or more processors may run concurrently. A lock may be used to prevent simultaneous access to a critical hardware or software resource (e.g., memory, central processing unit, file, data, table, etc.) by more than one processor. One processor may acquire and hold the lock until it releases the lock. Before the lock is released, another processor attempting to acquire the same lock may need to wait and repeatedly try to acquire the lock in a loop. Such a lock may be called a spinlock. This looping or spinning may waste the CPU time that can otherwise be used for other tasks. Typically, when a processor is waiting for a spinlock, it may execute an instruction to enter a wait mode to avoid using excess power by spinning. For example, the instruction may include an instruction to wait for an event, to wait for an interrupt, or any other suitable instruction based on the system architecture.

In a virtualized computer system, multiple virtual central processing units (vCPUs) may be executing on the same physical hardware. Generally speaking, virtualization is the creation of one or more logical systems from a single physical system. A virtualized system can allow time-sharing among multiple guest operating systems (OSs) on isolated virtual machines (VMs) in a physical hardware system, where applications running on a given guest environment (virtual machine) may view the virtual machine as a stand-alone system. A hypervisor, also referred to as a virtual machine manager (VMM), executing on a processor may emulate multiple virtual devices on a single physical device in a virtualized environment. The hypervisor may be configured to create, start, monitor, stop, or delete each of the VMs, and may execute at a higher privilege level than the VMs. In some implementations, the hypervisor can manage access controls, resources, scheduling, isolation, etc., for VMs that execute their respective guest operating systems on the processors. In a virtualized computer system, a VM may have multiple vCPUs, which may share physical CPUs with vCPUs from other VMs. Typically the total number of vCPUs across all VMs may exceed the number of physical CPUs. In some cases, such as cloud environments, there may be several times as many vCPUs as physical CPUs. To accomplish this, a hypervisor scheduler may give time slices of physical processor time to the vCPUs, similar to the way that an operating system schedules processes.

In a non-virtualized system, in most instances, a spinlock may be resolved quickly because the lock can generally be released after a short time period. However, a virtualized computing system may suffer performance degradation as a result of spinlock operations when multiple vCPUs executing on a single processor are waiting to acquire the lock. For example, in some instances, a vCPU that is holding the lock may be de-scheduled from execution for a long period of time and the other vCPUs of the same guest trying to acquire this lock may have to wait until the vCPU holding the lock is executed again and releases the lock. Furthermore, a simple spinlock may not be a fair lock. For example, in one instance, if multiple vCPUs are waiting to acquire the lock, the vCPU which wakes up before the other vCPUs may acquire the lock first, regardless of which vCPU first requested the lock. In another instance, the same vCPU may potentially get the lock in most cases as compared to the other waiting vCPUs. Thus, this unfairness in lock acquisition may result in one or more vCPUs waiting for the lock for an extended period of time to execute a critical section.

A ticket lock is a spinlock which can provide fairness in lock acquisition using tickets. The ticket lock may use the first-in-first-out concept as used by a ticket queue management system. For example, a vCPU may obtain a next ticket number to join a queue of vCPUs waiting to acquire the same ticket lock. Each vCPU contending for the same ticket lock may monitor an address for the ticket lock while waiting for the ticket lock to be available. When the ticket lock is released by a now serving vCPU, the now serving vCPU may atomically increment the next ticket number. Each vCPU waiting in the queue may wake up from the wait mode due to the write caused by the increment on the ticket lock address, and compare its respective ticket number with the next ticket number to be served. If there is a match, the vCPU with the matching ticket number will gain access to the ticket lock and the remaining vCPUs may enter the wait mode again by executing an instruction to enter the wait mode. Thus, the vCPUs may acquire the ticket lock in the order they obtained the tickets to wait in the queue. The hypervisor may be configured to schedule each of the vCPUs waiting for the lock for execution in an order in which each of the vCPUs first entered the wait mode.

Typically, when the vCPU executes an instruction to enter the wait mode, it either goes to a sleep mode until a wake up event occurs, or it sends an interrupt to the hypervisor which can then make a scheduling decision. For example, the hypervisor may schedule another vCPU to execute on the physical processor. However, in most instances, the overhead resulting from branching in and out of the hypervisor may be high as compared to waiting for the lock to resolve itself.

Some embodiments of the disclosed technologies can provide a mechanism to optimize the wait for the spinlock by allowing the vCPU to wait for an additional amount of time with an assumption that the lock is short lived and may be released soon. If the lock is not released within a predetermined duration, an interrupt may be sent to the hypervisor which can then make a scheduling decision. In some embodiments, an integrated circuit coupled to a processor may monitor a signal from the processor to determine when a vCPU executing on the processor has entered the wait mode. For example, the vCPU may execute a wait for event (WFE), an MWAIT, or any other similar instruction based on processor instruction set architecture to transition to a wait mode. When the vCPU enters the wait mode, a timer in the integrated circuit can start counting until it reaches a predetermined value. If a wake up event happens before the timer expires, the timer can be stopped and reset to the initial value. When the timer expires, a wake up signal may be sent to the processor causing an interrupt to the hypervisor. Thus, introducing delay during the wait mode can provide the additional time that may be sufficient for the lock to resolve on its own without the need for the vCPU to interact with the hypervisor through the interrupt.

When multiple vCPUs are in their respective wait mode waiting for the same ticket lock, some embodiments can introduce respective delays to the wait duration for each waiting vCPU. However, the additional delay can introduce false wake ups for the vCPUs waiting for the lock. For example, in a large system with multiple VMs executing on the processor(s), some of the waiting vCPUs may have to go through multiple wake ups whenever there is a match on the ticket lock address during the wait mode even if the lock was not resolved in their favor. Thus, the waiting vCPUs may wake up when there is a match on the ticket lock address, compare their own ticket number with the now serving ticket number and go back to the wait mode if there is no match. However, these false wake ups may result in losing the initial order in which the vCPUs originally entered the respective wait mode. Since the hypervisor may need to schedule each of the vCPUs waiting for the lock in the order in which each of the vCPUs first entered the wait mode, losing the order due to the introduction of the delay in the wait mode can result in performance degradation.

Some embodiments of the disclosed technologies can overcome this problem by keeping track of a first entry of each vCPU out of a plurality of entries into the wait mode within a window of time. In some implementations, the integrated circuit coupled to the processor can record a time stamp when each vCPU contending for the ticket lock enters the wait mode for a first time within a respective window of time. The window of time may correspond to a certain number of cycles, instructions, or any suitable measure after entering the wait mode by the vCPU, such that sufficient time has passed for all vCPUs involved with the lock to have completed execution of their respective critical sections, after which the tracking of the first entry for the vCPU for the same address can be reset. Any entry past the first entry into a wait mode by the vCPU during the window of time is considered a false wake up by the vCPU and is not tracked (or not used to update the time stamp for the vCPU entering the wait mode). The time stamp associated with each vCPU contending for the same ticket lock can be used by the hypervisor to restart and schedule the vCPUs to execute in an order in which they initially entered the wait mode.

Thus, some embodiments can allow the vCPUs to achieve higher performance by waiting a little longer for the lock instead of exiting to the hypervisor. For example, when a vCPU enters the wait mode, instead of exiting to the hypervisor, waiting a little longer can minimize the chances of having another vCPU get scheduled by the hypervisor to execute on the processor. Thus the waiting vCPU may achieve higher performance since it may acquire the lock sooner by waiting a little longer. In addition, the hypervisor can avoid using up CPU cycles for processing the interrupt, saving the current states, and making a decision on which vCPU to schedule next. Those CPU cycles can be used for other useful tasks.

FIG. 1 is a simplified block diagram of an example virtualized computer system 100, according to certain aspects of the disclosed technologies. The computer system 100 may include hardware resources 110 that may include one or more processors 104a, one or more memory devices 104b, one or more network devices 104c, or any suitable components. Each of the processors 104a may include one or more processor cores. The memory devices 104b may include a computer-readable storage medium 114 to store instructions for execution by the processors 104a. The computer-readable storage medium 114 may be non-transitory. A hypervisor 102 may execute on hardware resources 104 (e.g., through a host operating system) to manage a plurality of virtual machines on the computer system 100, such as a first virtual machine (VM) 110a, a second VM 110b, . . . , and an Nth VM 110n, where N is at least one and may be up to, e.g., 10 or more, 20 or more, or 100 or more. Some non-limiting examples of the processors 104a may include processors developed by Intel®, ARM®, AMD®, etc.

The hypervisor 102, also referred to as a virtual machine manager (VMM), can emulate multiple virtual devices on a single physical device in a virtualized environment. The hypervisor 102 can also manage the flow of information between software, the virtualized hardware, and the physical hardware. The hypervisor 102 may be configured to create, start, monitor, stop, or delete each of the VMs 110a-110n, and may execute at a higher privilege level than the VMs 110a-110n. In some implementations, the hypervisor 102 can manage access controls, resources, scheduling, isolation, etc., for the VMs 110a-110n that execute their respective guest operating systems. The hypervisor 102 may be implemented as a software layer or as code embedded in a firmware on the computer system 100. The hypervisor 102 may be a type-2 hypervisor (e.g., hosted hypervisor) or a type-1 hypervisor (e.g., bare-metal hypervisor), or any other suitable implementation.

Each of the VMs 110a-110n may be any suitable emulation of a computer system that may be managed by the hypervisor 102. Each of the VMs 110a-110n can run one or more independent operating systems and one or more applications or processes on the hardware resources 104. Two or more VMs from the VMs 110a-110n may execute simultaneously or in any order on the computer system 100. For example, in some instances, at a given time, the VMs 110a-110n may execute simultaneously on the computer system 100. In some instances, the VMs 110a-110n may execute on the computer system 100 one at a time. For example, the hypervisor 102 may create and start the first VM 110a for a first user. After the user finishes running applications or processes on the first VM 110a, the hypervisor 102 may stop and delete the first VM 110a and create and start the second VM 110b for a second user, and so on.

Each of the VMs 1110a-110n may be assigned one or more virtual CPUs (vCPUs) 112a, 112b, . . . , 112n. The vCPUs may be mapped to allocated time slices of available logical processors in the physical computer and can be scheduled by the hypervisor 102 to allow more virtual processors than available logical processors. One or more guest operating systems 108a, 108b, . . . , or 108n may run on the one or more vCPUs 112a, 112b, . . . , 112n in the first VM 110a, second VM 110b, . . . , or the Nth VM 110n, respectively. One or more guest applications 106a, 106b, . . . , or 106n may in turn run on and be managed by the corresponding guest operating systems.

In some implementations, a spinlock may be a mutual exclusion device that can have only two values: "locked" and "unlocked." It may be implemented as a single bit or a multiple bit integer value. A processor attempting to acquire a particular lock may test the relevant bit. If the lock is available, the "locked" bit may be set by the processor and the processor may continue into a critical section of a computer program. If, instead, the "locked" bit has already been set and the lock has been taken by another processor, the processor attempting to acquire the lock may go into a tight loop where it repeatedly checks the lock until it becomes available. The test and set operation may generally be done in an atomic manner so that only one processor can obtain the lock, even if several are spinning at any given time.

A vCPU in the wait mode may wait on a specific address, e.g., a lock address. In some implementations, a monitor may be used to store the lock address which the vCPUs contending for the same lock may wait on. For example, the monitor may correspond to a set of memory addresses that are used for exclusive accesses to perform load exclusive, store exclusive, or similar instructions. These instructions may be used to construct semaphores to ensure synchronization between different processes running on the same processor, or between different processors to maintain coherency for a shared memory location.

In a virtualized computer system, if a number of vCPUs from the vCPUs 112a-112n simultaneously attempt to access a critical resource, such as update a same memory location, each vCPU may wait for its turn. A lock may be used to provide mutual exclusion and enforce atomic operations, and atomic instructions may be used to arbitrate between simultaneous attempts to acquire the lock. Once a vCPU acquires the lock, the lock may generally be held by the vCPU until the lock is explicitly released. When the lock is being held by a vCPU, another vCPU attempting to acquire the lock may repeatedly try to acquire the lock in a tight loop called a spinlock, and the activity or retrying is known as "spinning," which refers to the operation of repeatedly checking the lock to see if it is available. Because the spinning vCPU remains active but is not performing a useful task, the use of such a lock is a "busy waiting" and may waste CPU time. Thus, using spinlocks may avoid overhead from rescheduling or context switching by the operating system, and may be efficient if the vCPU only holds the lock for a short period of time. However, in virtualized computer systems, the assumption that spinlocks are generally held for a short period of time may not be guaranteed.

In some instances, if the virtualized system has more vCPUs attempting to run than the physical processors available to run them, some of the vCPUs may be preempted to let others run. Thus, virtualized systems, especially ones with CPU oversubscription, may schedule virtual CPUs in and out of execution. This may allow the vCPUs to share the physical CPU resources effectively, but it breaks the assumption in the spinlock technique that a vCPU is not preempted while holding a spinlock. Thus, in a virtualized system, a lock-holder preemption may occur when a lock-holding virtual CPU running on a virtual machine is not scheduled by the hypervisor to run, while other vCPUs trying to acquire the same lock will be stuck in a loop waiting for the lock to be released, which may not happen until the lock-holding vCPU is scheduled back to run.

As an example, a first vCPU from the vCPUs 112a-112n may acquire a lock, but may be preempted by the hypervisor scheduler before it finishes. While the first vCPU holds the lock, a second vCPU from the vCPUs 112a-112n may try to acquire the lock. As such, the second vCPU, instead of spinning for a short period of time that the first vCPU needs the spinlock for, may be spinning until the first vCPU is rescheduled to run again, which may be anywhere from several milliseconds to hundreds of milliseconds, depending on how busy the system is. The second vCPU is using the CPU but does not accomplish its intended task. Thus, the second vCPU may use its VM's share of CPU time, and keep other vCPUs with useful work to do from running. In some cases, the reason why the first vCPU is not running may be because the hypervisor's scheduler is trying to give priority to the second vCPU. In other words, the second vCPU may be actively keeping the first vCPU from finishing the work that it needs to do with the spinlock and releasing the exact spinlock that the second vCPU is waiting for. Thus, the system performance can go down considerably.

In some implementations, instead of waiting in a loop, a vCPU may send an interrupt to the hypervisor 102 which can then make a scheduling decision. However, transitioning into and out of the hypervisor 102 may result in an overhead, since additional CPU cycles may be needed to process the interrupt and also to schedule the next vCPU to run on the processor 104a. Some embodiments of the disclosed technologies can perform wait optimization by introducing certain delay before sending an interrupt to the hypervisor 102 with the assumption that the spinlock can resolve within a short amount of time. Thus, the overhead of transitioning into and out of the hypervisor 102 can be avoided. This is further explained with reference to FIG. 2.

Figure 2:
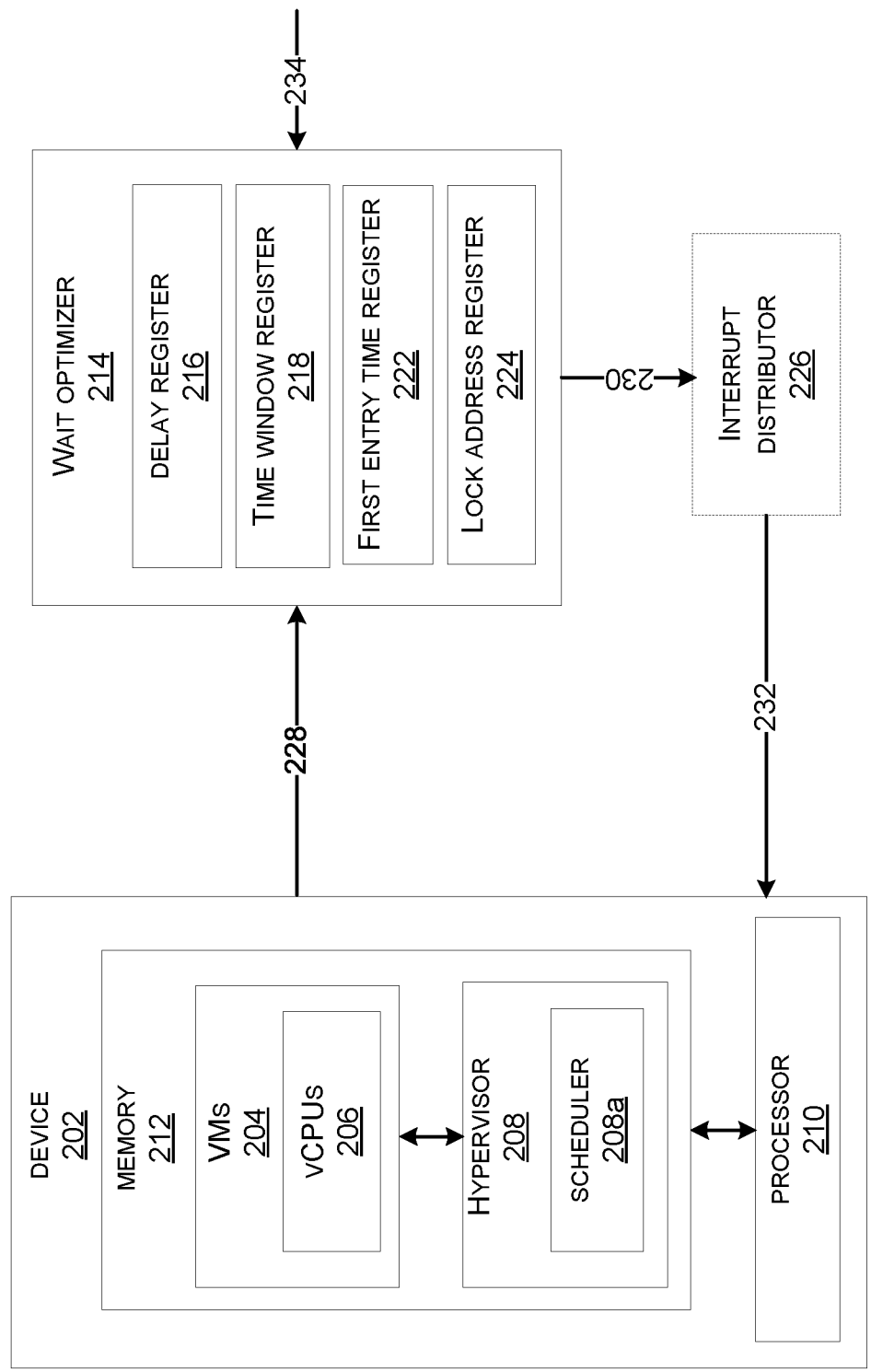
FIG. 2 illustrates an apparatus comprising a wait optimizer to perform wait optimization for a processor, in one embodiment.

FIG. 2 illustrates an apparatus 200 comprising a wait optimizer to perform wait optimization for a processor, in one embodiment. The wait optimizer may be implemented using an integrated circuit, a field programmable gate array (FPGA), or any suitable circuit.

The apparatus 200 may include a wait optimizer 214 coupled to a device 202. An optional interrupt distributor 226 may be coupled to the wait optimizer 214 and to the device 202. In some implementations, the interrupt distributor 226 may be integrated with the device 202.

The device 202 may include a processor 210 coupled to a memory 212. The memory 212 may be configured to store instructions for execution by the processor 210. For example, the instructions may be stored in a computer readable medium. The instructions may include instructions for executing a hypervisor 208 and VMs 204. The VMs 204 may be similar to the VMs 110a-110n, and the vCPUs 206 may be similar to the vCPUs 112a-112n as discussed with reference to FIG. 1. The processor 210 may be one of the processors 104a, and may include one or more processor cores. Note that the device 202 may include additional or different components than shown in FIG. 2, which are not shown here for the purposes of simplicity.

The hypervisor 208 may be similar to the hypervisor 102. The hypervisor 208 may include a scheduler 208a. The scheduler 208a may be configured to give time slices of physical processor time of the processor 210 to the vCPUs since there may be a greater number of vCPUs attempting to run than the physical processors available to run them. Generally, the scheduler 208a may be configured to schedule each of the vCPUs for execution in order in which each of the vCPUs first entered the wait mode. In some embodiments, the hypervisor 208 may be configured to program the device 202 to not trap on the wait instructions. For example, the hypervisor 208 may program the appropriate register(s) so that an exit to an interrupt routine does not occur when a wait instruction is executed by any of the participating vCPUs. This may minimize the overhead caused by transitioning in and out of the interrupt routine and save CPU cycles which may be used for other useful tasks.

The vCPUs 206 may include a plurality of vCPUs. In some implementations, the plurality of vCPUs may include different sets of vCPUs. For example, different sets of vCPUs may be associated with different guest operating systems, virtual machines, logical processors, etc. In some instances, a set of the vCPUs from the vCPUs 206 may be configured to execute a critical section. A spin lock may be used so that only one vCPU from the set of the vCPUs may have access to the critical section at any point in time. For example, a first vCPU may acquire the lock before executing the critical section and hold the lock while executing the critical section. Other vCPUs in the set may enter a wait mode until the lock is released. Once the first vCPU releases the lock after finishing with the execution of the critical section, the next vCPU waiting for the lock may acquire the lock and so on.

In some implementations, a wait mode may correspond to a sleep state. For example, the sleep state may imply different variations of a low power state that may include switching off certain portions of the processor to save power. Generally, a waiting vCPU may stay in the wait mode until a wake up event occurs. The wake up event may be triggered by another vCPU or another processor sending a wake up event signal (e.g., by executing a send event (SEV) instruction). In some instances, the wake up event may occur when a last address loaded in a monitor is being cleared. For example, the monitor may store an address of the lock on which the vCPUs contending for the same lock are waiting on.

A ticket lock is a spinlock which can provide fairness in lock acquisition using tickets. The ticket lock may use the first-in-first-out concept as used by a ticket queue management system. For example, each vCPU from the set of the vCPUs may get a ticket number to get in a queue to acquire the ticket lock to gain access to the critical section. In some implementations, each vCPU may store its acquired ticket number in a memory assigned to that vCPU, or in a register. Each vCPU may atomically obtain and then increment the ticket number to join the queue of waiting vCPUs. The atomicity of this operation may be required to prevent two vCPUs from simultaneously being able to obtain the same ticket number. Each vCPU from the set may be configured to enter a wait mode while waiting for the ticket lock to be available. For example, each vCPU may monitor an address to determine if the address matches with a ticket lock address. In some implementations, the address may be loaded in a monitor or an exclusive monitor. When there is a match on the ticket lock address, each contending vCPU may wake up from the wait mode, and compare their ticket number with the now serving ticket number to determine if there is a match on the ticket number. If there is a match, the vCPU with the matching number may acquire the ticket lock and the other contending vCPUs may enter the wait mode again. Ticket locks are further explained with reference to FIGS. 3A and 3B.

FIG. 3A illustrates an example of a ticket lock 300 in one embodiment. In some implementations, the ticket lock 300 may include a next field 300a and an owner field 300b. The owner field 300b may correspond to an address of the current owner of the ticket lock, e.g., a now serving ticket number in the queue. The next field 300a may correspond to an address of the next ticket number in the queue. Each of the next field 300a and the owner field 300b may include one or more bytes. The ticket lock 300 may be implemented using any suitable implementation, e.g., an addressable memory location in the memory 212, a register, etc.

FIG. 3B illustrates a table 300 showing an order of ticket lock acquisition by a set of vCPUs, in one embodiment. Referring back to FIG. 2, the vCPU1 304a, vCPU2 304b, vCPU3 304c, and the vCPU4 304d may be a set of the vCPUs from the vCPUs 206. The vCPU1 304a, vCPU2 304b, vCPU3 304c and the vCPU4 304d may attempt to acquire the ticket lock 300 to execute a critical section on the processor 210. The hypervisor 208 may be configured to schedule the vCPU1 304a, vCPU2 304b, vCPU3 304c and the vCPU4 304d to execute in an order they initially entered the wait mode.

Initially, in 302a, the next field 300a and the owner field 300b may each be zero before the ticket lock is acquired by any vCPU. For example, the next field 300a and the owner field 300b may be zero by default or at reset.

In 302b, the vCPU1 304a may attempt to acquire the ticket lock 300. For example, the vCPU1 304a may acquire a next ticket number in the queue, and store it in a memory assigned to the vCPU1 304a, or in a register. The next ticket number may be zero, therefore, the vCPU1 304a may succeed in acquiring the ticket lock. As an example, the owner field 300b may indicate the ticket number of the vCPU1 304a, which is currently holding the lock. The next field 300a may be incremented to one to indicate the next ticket number in the queue.

In 302c, the vCPU3 304c may attempt to acquire the ticket lock. For example, the vCPU3 304c may acquire the next ticket number in the queue, and store it in a memory assigned to the vCPU3 304c, or in a register. The next ticket number may be equal to one. However, the vCPU1 304a is still holding the lock, therefore, the vCPU3 304c's attempt to acquire the lock may fail and the vCPU3 304c may enter a wait mode, e.g., by executing a wait instruction. The next field 300a may be incremented to two to indicate the next ticket number in the queue.

In 302d, the vCPU4 304d may also attempt to acquire the ticket lock. The vCPU4 304d may acquire the next ticket number in the queue, and store it in a memory assigned to the vCPU4 304d, or in a register. The next ticket number may be equal to two. However, the vCPU1 304a is still holding the lock, therefore, the vCPU4 304d's attempt to acquire the lock may fail and the vCPU4 304d may enter the wait mode as well, similar to the vCPU3 304c. The next field 300a may be incremented to three to indicate the next ticket number in the queue.

In 302e, the vCPU2 304b may also attempt to acquire the ticket lock. The vCPU2 304b may acquire the next ticket number in the queue, and store it in a memory assigned to the vCPU2 304b, or in a register. The next ticket number may be equal to three. However, the vCPU1 304a is still holding the lock, therefore, the vCPU2 304b's attempt to acquire the lock may fail and the vCPU2 304b may enter the wait mode as well, similar to the vCPU3 304c and the vCPU4 304d. The next field 300a may be incremented to four to indicate the next ticket number in the queue.

In 302f, the vCPU1 304a may release the ticket lock, e.g., the vCPU1 304a may have finished executing the critical section. Now the ticket number for the current owner vCPU1 304a may be incremented by one indicating the new owner number as one. Since, the vCPU2 304b, vCPU3 304c, and the vCPU4 304d are waiting on the lock address, the vCPU2 304b, vCPU3 304c, and the vCPU4 304d may wake up from the wait mode because of the match on the lock address. Each of the vCPU2 304b, vCPU3 304c, and the vCPU4 304d may compare their respective ticket numbers with the owner ticket number or the now serving ticket number. Since the vCPU3 304c's ticket number is one, the vCPU3 304c may acquire the lock. The owner field 300b value of one may indicate that the lock is currently held by the vCPU3 304c. The vCPU2 304b and the vCPU4 304d may go back to the wait mode.

In 302g, the vCPU3 304c may release the ticket lock, e.g., the vCPU3 304c may have finished executing the critical section. Now the ticket number for the current owner vCPU3 304c may be incremented by one indicating the new owner number as two. The vCPU2 304b and the vCPU4 304d may wake up again from the wait mode because of the match on the lock address. Each of the vCPU2 304b and the vCPU4 304d may compare their respective ticket numbers with the owner ticket number. Since the vCPU4 304d's ticket number is two, the vCPU4 304d may acquire the lock. The owner field 300b may indicate that the lock is currently held by the vCPU4 304d. The vCPU2 304b may go back to the wait mode again.

In 302h, the vCPU4 304d may continue to hold the ticket lock while executing the critical section. The owner field 300b may indicate that the lock is currently held by the vCPU4 304d. The vCPU2 304b may continue to wait for the ticket lock in a spin loop.

In 302i, vCPU4 304d may release the ticket lock, e.g., the vCPU4 304d may have finished executing the critical section. Now the ticket number for the current owner vCPU4 304d may be incremented by one indicating the new owner number as three. The vCPU2 304b may wake up again from the wait mode because of the match on the lock address. The vCPU2 304b may compare its ticket number with the owner ticket number. Since the vCPU2 304b's ticket number is three, the vCPU2 304b may acquire the lock. The owner field 300b may indicate that the lock is currently held by the vCPU2 304b. If another vCPU tries to acquire the lock now, it may get assigned the ticket number equal to four and it may wait until the vCPU2 304b releases the ticket lock. Note that the vCPU waiting to acquire the lock may be one of the vCPUs which may have previously held the ticket lock (e.g., the vCPU1 304a or vCPU3 304c) or another vCPU (not shown). Thus, generally, the ticket locks may allow acquiring the lock in an order in which they obtained the ticket number to be in the queue.

Referring back to FIG. 2, some embodiments of the disclosed technologies can utilize the wait optimizer 214 to introduce a certain amount of delay in the wait mode with an assumption that the lock can resolve itself instead of exiting to the hypervisor 208. The wait optimizer 214 may include a delay register 216, a time window register 218, a first entry time register 222, and a lock address register 224 associated with each vCPU of the vCPUs 206. Note that the wait optimizer 214 may include additional components which will be discussed with reference to FIG. 4.

The delay register 216 may include a value corresponding to an amount of delay that can be introduced when a vCPU enters the wait mode. For example, the amount of delay may be defined as time units, number of cycles, number of instructions, or any suitable measure. The time window register 218 may be used to provide a window of time during which subsequent entries after the first entry of a given vCPU into the wait mode are ignored. The window of time may be defined as time units, number of cycles, number of instructions, or any suitable measure. The lock address register 224 may be used to store the address of the ticket lock a set of vCPUs are attempting to acquire. The first entry time register 222 may be used to record a time stamp for a first entry of the given vCPU into the wait mode. In some implementations, the first entry time register 222 and the lock address register 224 may be part of the same register and may be used together by the hypervisor 208 for waking up and rescheduling the vCPUs in the right order.

The delay register 216, time window register 218, first entry time register 222 and the lock address register 224 may be accessible by the hypervisor 208. For example, the hypervisor 208 may be configured to program the time window register 218 and the delay register 216 with respective predetermined values. The hypervisor 208 may also be configured to read the first entry time register 222 and the lock address register 224. The delay register 216, and the time window register 218 may include same or different values for each vCPU from the vCPUs 206. It will be understood that different implementations for each of the delay register 216, time window register 218, first entry time register 222 or the lock address register 224 may include using a single register for all the vCPUs (e.g., different bits of the register allocated to each vCPU), a separate register for each vCPU, or another suitable implementation.

In some embodiments, the wait optimizer 214 may be configured to monitor a signal 228 from the device 202 to determine an entry of a vCPU from the vCPUs 206 into the wait mode. When the entry is detected into the wait mode, the wait optimizer 214 may wait for a delay amount equal to a value programmed in the delay register 216 for that vCPU before generating an event signal 230. The event signal 230 may be used by the interrupt distributor 226 to generate an interrupt 232 to the device 202. For example, the interrupt 232 may be a peripheral interrupt or any other type of interrupt.

As discussed previously, the delay is introduced in generating the interrupt to the hypervisor 208 with the assumption that the spinlock can resolve itself within that duration and thus the overhead which can be introduced due to interacting with the hypervisor 208 can be avoided. As a set of vCPUs enter the wait mode contending for the same ticket lock, respective delays may be introduced for each vCPU from the set contending for the same lock in sending the respective interrupts to the hypervisor 208. However, delaying the respective exits to the hypervisor 208 may result in losing the order in which the given vCPUs first entered the wait mode since the wakeups may not happen in the same order. For example, when multiple vCPUs are waiting to acquire a ticket lock, every time there is a match on the ticket lock address, all the waiting vCPUs may wake up from the wait mode and compare their ticket number with the next ticket number in the queue. The vCPU with the matching ticket number may acquire the ticket lock and the remaining vCPUs may enter the wait mode again. Thus, a set of the vCPUs may have to go through multiple false wakeups while in the wait mode. The process of multiple wakeups and entries to the wait mode may change the order in which the vCPUs in the set initially entered the wait mode.

As an example, referring back to FIG. 3, the vCPU3 304c may have a first delay when entering the wait mode in 302c, the vCPU4 304d may have a second delay when entering the wait mode in 302d, and the vCPU2 304b may have a third delay when entering the wait mode in 302e. In 302f, when the vCPU1 304a releases the lock, the vCPU2 304b, vCPU3 304c, and the vCPU4 304d may wake up from the wait mode since the ticket lock address will match. As discussed above, the vCPU3 304c may be next in the queue and may acquire the lock. The vCPU2 304b and the vCPU4 304d may enter the wait mode again. However, this may result in losing the order in which the vCPU2 304b and the vCPU4 304d first entered the wait mode. Therefore, the hypervisor 208 may not be able to determine the order to wake up and schedule the vCPUs in the order they initially entered the wait mode.

Certain embodiments of the disclosed technologies can provide a mechanism to keep a record of the order in which each vCPU from a set of vCPUs initially enters the wait mode so that the hypervisor 208 can use this information to wake up and schedule those vCPUs in the same order. Some embodiments can determine a first entry of each vCPU from a plurality of entries into the wait mode within a window of time. For example, the plurality of entries into the wait mode may have occurred due to false wake ups caused by other vCPUs as they acquire and release the lock respectively.

In certain embodiments, the wait optimizer 214 may be configured to record a time stamp of only a first entry of a vCPU into the wait mode from a plurality of entries within a window of time. The window of time may be recorded in the time window register 218. In some implementations, the time window register 218 may include a respective window of time associated with each vCPU of the vCPUs 206. For example, the window of time may correspond to a certain number of cycles, instructions, or any suitable measure after entering the wait mode by the vCPU, such that sufficient time has passed for all vCPUs from the vCPUs 206 involved with the lock to have completed execution of their respective critical sections, after which the tracking of the first entry for the vCPU for the same address can be reset. Any entries past the first entry into a wait mode by the vCPU during the window of time is considered a false wake up by the vCPU and is not tracked (or not used to update the time stamp for the vCPU entering the wait mode). Generally, the window of time may be determined based on a number of factors associated with the system, e.g., worst case memory latency, time required for executing certain instructions for the device 202, such as load, compare, store, etc.

A first entry time for a given vCPU may be recorded in the first entry time register 222 by recording a time stamp from a global clock source (not shown) in the system available via a signal 234. An address of the ticket lock associated with the first entry time may be recorded in a lock address register 224. In some implementations, the first entry time register 222 may be configured to record a respective first entry time associated with each of the vCPUs 206, and the lock address register 224 may be configured to record a respective lock address associated with each of the vCPUs 206.

The hypervisor scheduler 208a may be configured to schedule each of the vCPUs for execution in order in which each of the vCPUs first entered the wait mode. In some embodiments, the hypervisor 208 may be configured to read the lock address register 224 and the first entry time register 222 to determine the first entry time a given vCPU entered the wait mode for the given lock address. The hypervisor scheduler 208a may use the first entry times associated with each vCPU to intelligently wake up a vCPU from the set of vCPUs, which may be next in the queue to acquire the lock, so that the given vCPU can qualify itself to run the critical section. For example, the hypervisor scheduler 208a may first wake up the vCPU with the earliest time stamp out of the recorded time stamps. The lock address recorded in the lock address register 224 may be the same for all the vCPUs in the set of vCPUs which are contending for the same lock. In some systems, different set of vCPUs may contend for different ticket locks to execute different critical sections, and hence may be associated with different lock addresses. The hypervisor 208 may read the lock address register 224 corresponding to the first entry time register 222 for each vCPU to schedule the vCPUs that are contending for the same ticket lock in the appropriate order.

The interrupt distributor 226 may be configured to send an interrupt to the device 202. In some embodiments, the interrupt distributor 226 may receive an event signal 230 from the wait optimizer 214, and send an interrupt 232 to the device 202. For example, the interrupt 232 may include a private peripheral interrupt. In some implementations, the interrupt 232 may include information to indicate the type of source instruction, e.g., WFE, MWAIT, etc., that was executed to enter the wait mode. For example, the information may include an interrupt identifier. The hypervisor 208 may use the interrupt to determine that it needs to perform scheduling. The hypervisor 208 may read the first entry time register 222 and the lock address register 224 associated with each vCPU contending for the same ticket lock and determine the order of scheduling the vCPUs. Thus the vCPUs are scheduled to run in the same order as they entered the wait mode such that the vCPUs wake up from the wait mode in the appropriate order. In some implementations, the interrupt 232 may be sent to the processor 210 via an interrupt controller (not shown), which may be internal or external to the device 202.

Figure 4:
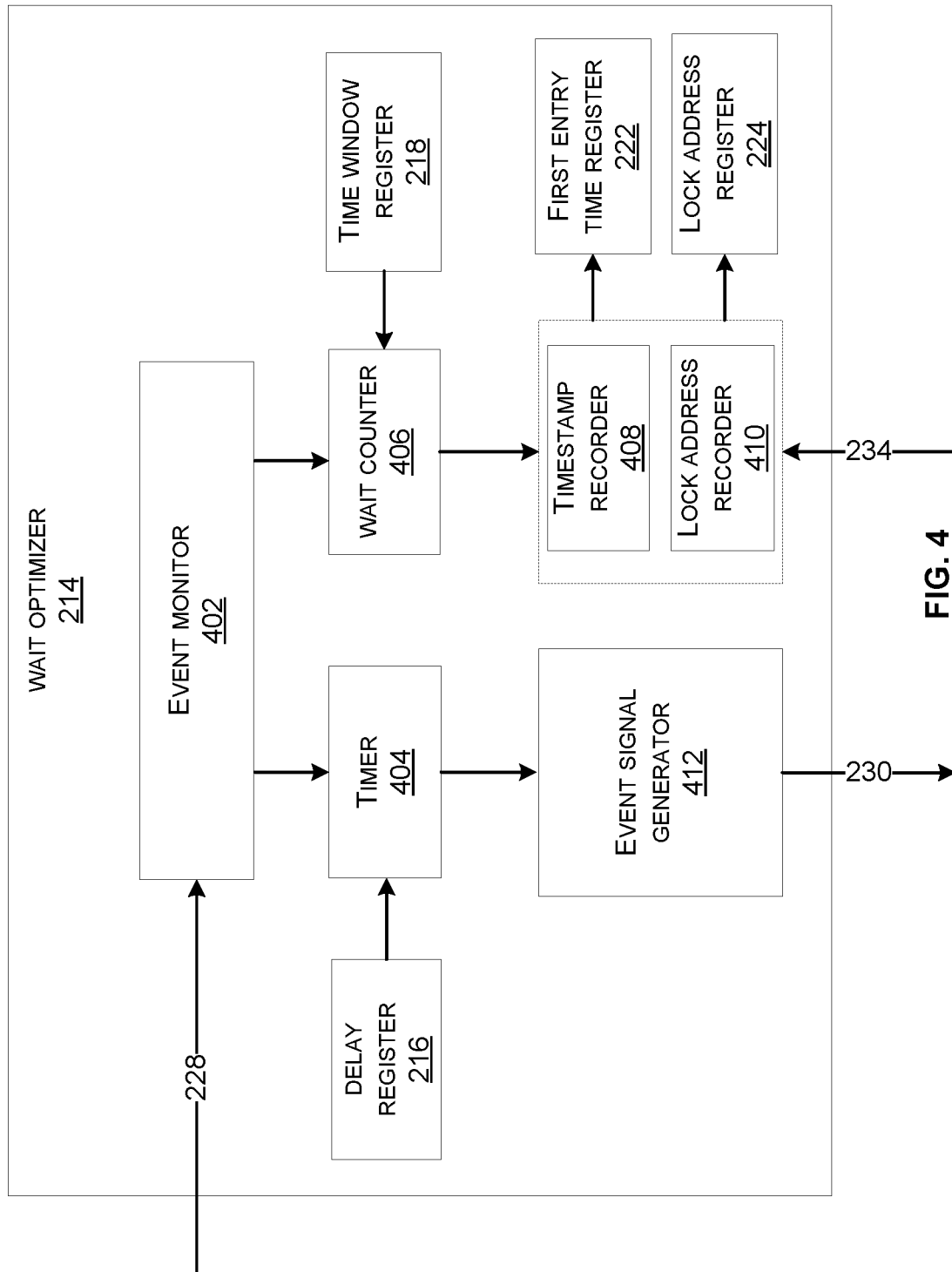
FIG. 4 illustrates a block diagram of the wait optimizer, in one embodiment.

FIG. 4 illustrates a block diagram of the wait optimizer 214, in one embodiment. In one implementation, the wait optimizer 214 may include an event monitor 402, a timer 404, a wait counter 406, a timestamp recorder 408, a lock address recorder 410, and an event signal generator 412, in addition to the delay register 216, time window register 218, first entry time register 222 and the lock address register 224.

The event monitor 402 may be configured to monitor a signal from the processor to detect an entry of a vCPU executing on the processor into the wait mode. For example, the event monitor 402 may be configured to monitor the signal 228 from the device 202 to detect an entry of a vCPU from the vCPUs 206 into the wait mode. As discussed previously, the vCPU may belong to a set of vCPUs contending to acquire a lock to execute a critical section. The set of vCPUs may attempt to acquire the lock in a certain order. In some embodiments, the signal 228 may correspond to a wait-for-event (WFE) or an MWAIT signal from the device 202. For example, the vCPU attempting to acquire the lock may execute the WFE, the MWAIT or another similar instruction to enter the wait mode if the lock is not currently available. The event monitor 402 may detect the entry into the wait mode when the signal 228 changes from one level to another level (e.g., a high level to a low level, or vice-versa), from one value to another value, or using any other suitable implementation.

The timer 404 may be configured to count until the timer reaches a predetermined value, while the vCPU is in the wait mode. In one implementation, the timer 404 may be initialized with a value programmed in the delay register 216 and the timer 404 may count down to the predetermined value. For example, the predetermined value may be zero or any other value. In another implementation, the timer 404 may be initialized with zeros and the timer 404 may count up to the predetermined value, which may be the value programmed in the delay register 216.

The event signal generator 412 may be configured to generate an event signal 230 when the timer 404 counts to a value in the delay register 216. The event signal 230 may be used by the interrupt distributor 226 to send an interrupt to the device 202. In some embodiments, the event signal generator 412 may provide information associated with the source instruction executed by the vCPU to the interrupt distributor 226 via the event signal 230, which can be used by the interrupt distributor 226 to generate appropriate interrupt identifier for the hypervisor 208.

The wait counter 406 may be configured to start counting when the vCPU enters the wait mode and the wait counter 406 is not equal to a threshold value. For example, the threshold value may be a value programmed in the time window register 218. In one implementation, the wait counter 406 may be initialized to the value programmed in the time window register 218 before the vCPU enters the wait mode for the first time, or upon expiration of the window of time. For example, the window of time may correspond to the time taken by the wait counter 406 to count until it reaches the threshold value.

The timestamp recorder 408 may be configured to record a timestamp into the first entry time register 222 when a first entry of a vCPU into the wait mode is detected. The timestamp recorder 408 may then store the time stamp in the first entry register 222 based on the system clock source via the signal 234. In some embodiments, the timestamp recorder 408 may be configured to determine that a given entry is the first entry of the vCPU into the wait mode within the window of time based on determining a number of cycles that have passed or a number of instructions that have been executed between detecting a previous entry of the vCPU into the wait mode and the given entry of the vCPU into the wait mode. For example, the window of time may correspond to a certain number of cycles, a certain number of instructions, or any other suitable measure.

In some implementations, the timestamp recorder 408 may determine that an entry is a first entry when a window of time corresponding to a value programmed in the time window register 218 has passed between the given entry and a previous entry. As an example, an entry may be considered a first entry if the wait counter 406 is equal to the value programmed in the time window register 218, when the vCPU enters the wait mode. The wait counter 406 may be initialized to a first value after recording the first entry. For example, the first value may be zero. The wait counter 406 may continue to count until it reaches the value programmed in the time window register 218. Any entries into the wait mode by the same vCPU, while the wait counter 406 is counting, may not be recorded. Once the wait counter 406 reaches the threshold value, a next entry by the same vCPU into the wait mode may be recorded again as the first entry with a new timestamp. In some other embodiments, a type of instruction executed by the vCPU may be used to determine if an entry is the first entry. For example, detecting a first forward branch instead of a backward branch may be an indication of a first entry into the wait mode.

The lock address recorder 410 may be configured to record a lock address into the lock address register 224 when a first entry of a vCPU into the wait mode is detected. In some implementations, the lock address, when the vCPU entered the wait mode, may be captured from the monitor as discussed previously. Since different sets of vCPUs may be contending for different locks, the lock address recorded in the lock address register 224 together with the time stamp for the first entry recorded in the first entry time register 222 may be used to order the wake ups and scheduling of the corresponding vCPUs in the order they initially entered the wait mode.

Figure 5:
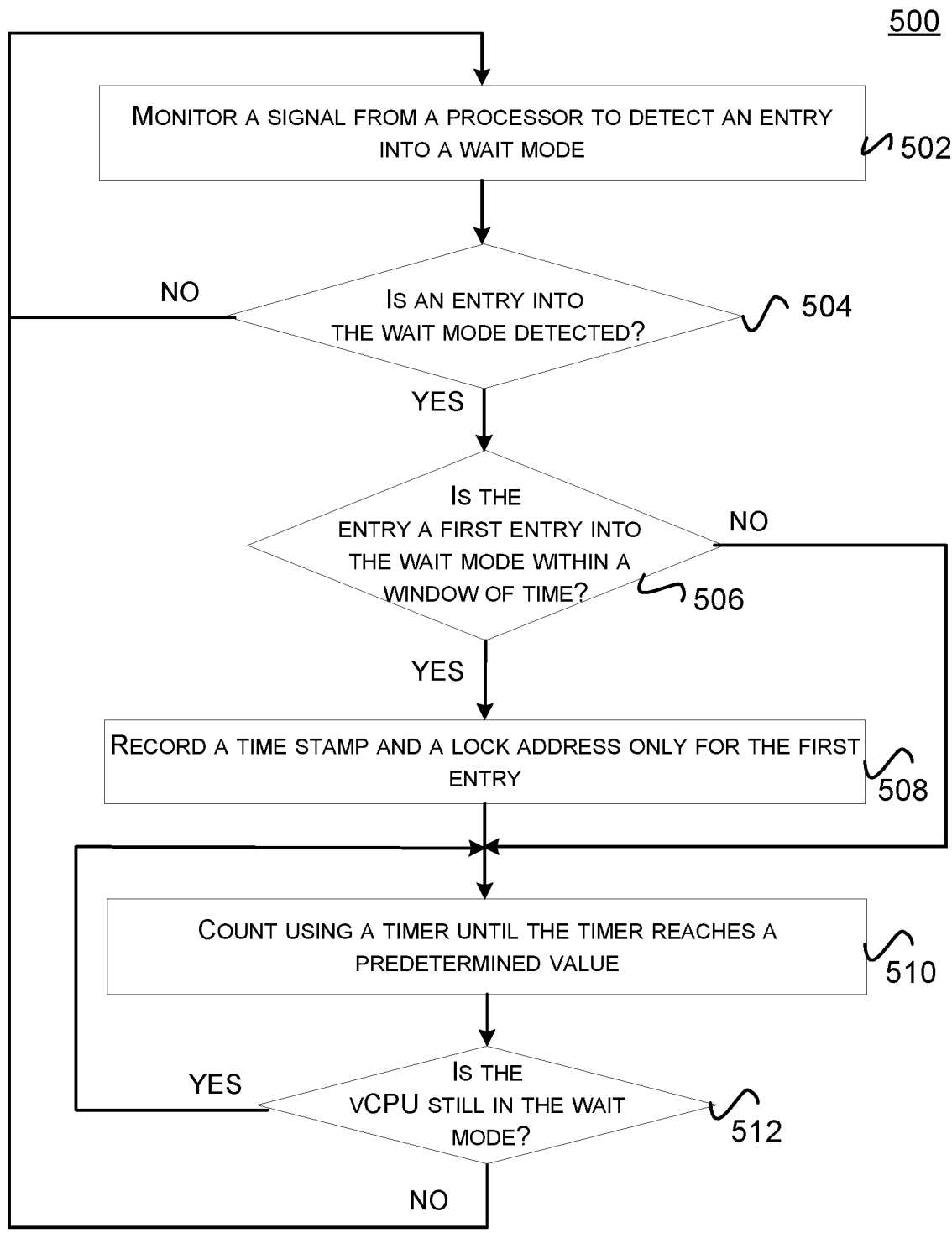
FIG. 5 illustrates a method executed by an integrated circuit to perform wait optimization, in one embodiment.

FIG. 5 illustrates a method 500 executed by an integrated circuit to perform wait optimization, in one embodiment. For example, the method 500 may be executed by the wait optimizer 214 coupled to the device 202, as discussed with reference to FIG. 2.

In step 502, the integrated circuit may monitor a signal from a processor to detect an entry into a wait mode. Referring back to FIG. 4, the event monitor 402 may monitor the signal 228 from the device 202 to determine an entry of a vCPU into a wait mode. For example, the vCPU may be contending to acquire a spinlock to execute a critical section and may have executed an instruction to enter the wait mode. In some implementations, a change in the level, or change in the value of the signal 228 may be an indication of the entry into the wait mode. The vCPU may belong to a set of vCPUs from the vCPUs 206 contending for the same lock. The instruction to enter the wait mode may include a WFE instruction, an MWAIT instruction, or a similar instruction based on the instruction set architecture implemented by the device 202.

In step 504, the method 500 may determine if an entry into the wait mode is detected. If an entry into the wait mode is not detected, the event monitor 402 may keep monitoring the signal 228 from the device 202 in the step 502.

In step 506, the wait optimizer 214 may determine if the entry is a first entry into the wait mode within a window of time. For example, the window of time may correspond to one thousand cycles or any other predefined value. Referring back to FIG. 4, the timestamp recorder 408 may determine if the entry is the first entry. For example, if the wait counter 406 is equal to a threshold value programmed in the time window register 218, the entry may be the first entry within a window of time corresponding to the threshold value in the time window register 218. If the wait counter 406 is not equal to the threshold value, the entry may not be the first entry within that window of time. The wait counter 406 may continue counting until the wait counter 406 reaches the threshold value. As discussed with reference to FIG. 2, in some implementations, the time window register 218 may be initially programmed with the threshold value by the hypervisor 208 before the vCPU enters the wait mode for the first time so that the entry into the wait mode is recorded as the first entry.

In step 508, if the entry is the first entry into the wait mode, the wait optimizer 214 may record a time stamp and a lock address only for the first entry of the vCPU into the wait mode. Referring back to FIG. 4, the timestamp recorder 408 may record the time stamp in the first entry time register 222 using the clock source via the signal 234. The lock address recorder 410 may record the lock address in the lock address register 224.

In step 510, the wait optimizer 214 may count using a timer until the timer reaches a predetermined value. For example, the timer 404 may count until the timer 404 reaches the value programmed in the delay register 216 while the vCPU is still in the wait mode. The timer 404 may be used to introduce a delay once the vCPU enters the wait mode as discussed with reference to FIG. 2. When the timer 404 reaches the value programmed in the delay register 216, the event signal generator 412 may generate the event signal 230. The event signal 230 may be used by the interrupt distributor 226 to send a peripheral interrupt 232 to the hypervisor 208. The hypervisor 208 may read the first entry time register 222 and the lock address register 224 for scheduling the execution of the vCPUs in the order they entered the wait mode, as discussed with reference to FIG. 2. Introducing the delay in the wait mode using the timer 404 may improve the chances of acquiring the lock without exiting to the hypervisor 208, which may consume additional CPU cycles.

In step 512, the wait optimizer 214 may determine whether the vCPU is still in the wait mode while the timer 404 is counting. If the vCPU is still in the wait mode, the timer 404 may continue to count until the timer reaches the predetermined value in step 510. If the vCPU is no longer in the wait mode, the wait optimizer 214 may branch back to monitoring the signal 228 from the device 202 to detect the next entry in to the wait mode. For example, in some instances, an external event from another processor may send a wake up signal to wake up the vCPU from the wait mode.

Figure 6:
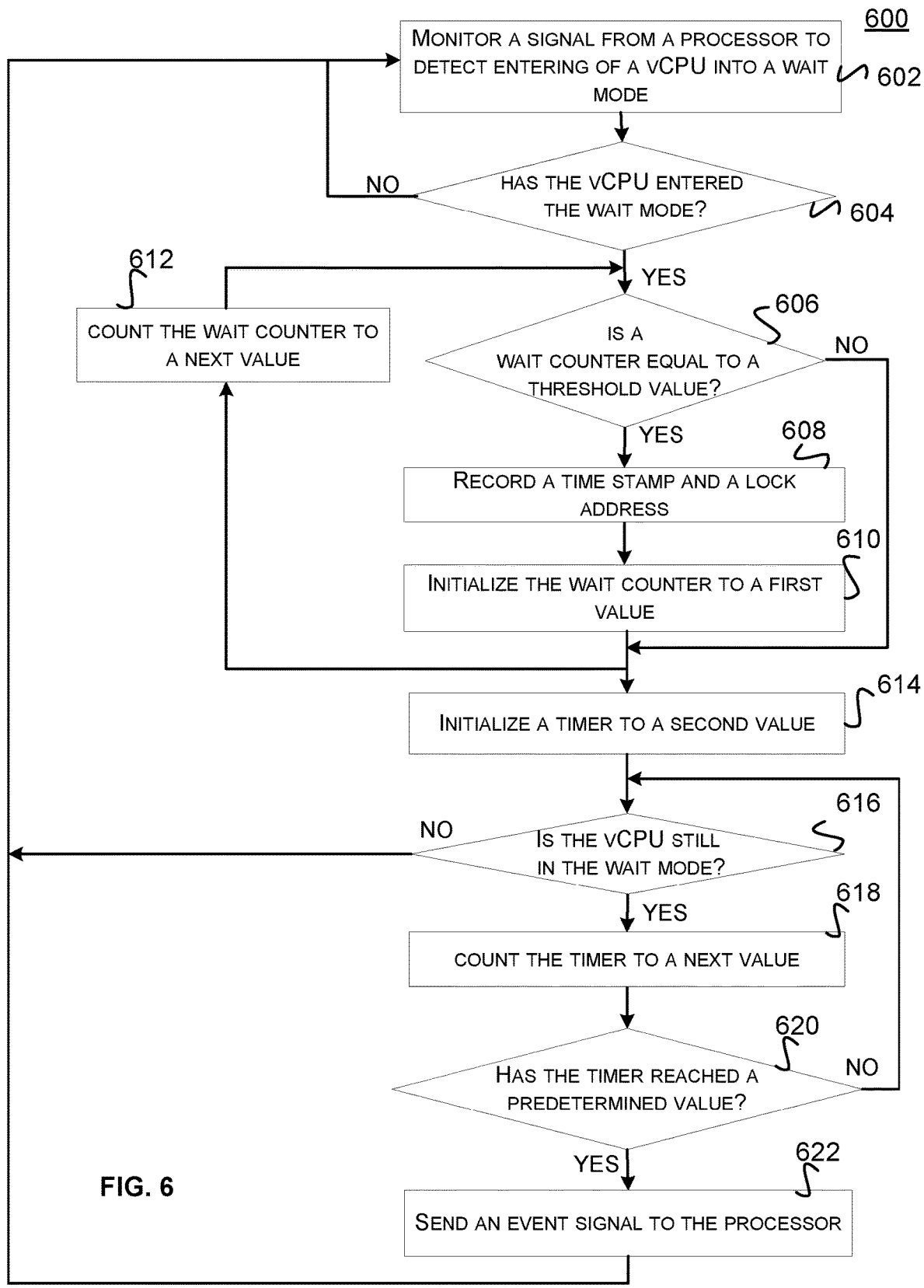
FIG. 6 illustrates a method executed by an integrated circuit to perform wait optimization for ticket locks, in one embodiment.

FIG. 6 illustrates a method 600 executed by an integrated circuit to perform wait optimization for ticket locks, in one embodiment. For example, the method 600 may be executed by the wait optimizer 214 coupled to the device 202 as discussed with reference to FIG. 2.

In step 602, the integrated circuit may monitor a signal from a processor to detect entering of a vCPU into a wait mode. Referring back to FIG. 4, the event monitor 402 may monitor the signal 228 from the device 202 to determine an entry of a vCPU into a wait mode. For example, the vCPU may have executed an instruction to enter the wait mode for waiting to acquire a ticket lock to execute a critical section. In some implementations, a change in the level or a value of the signal 228 may be an indication of the entry into the wait mode. The vCPU may belong to a set of vCPUs from the vCPUs 206 contending for the same ticket lock. The instruction to enter the wait mode may include a WFE instruction, an MWAIT instruction, or a similar instruction based on the instruction set architecture implemented by the device 202.

In step 604, the wait optimizer 214 may determine if the vCPU has entered the wait mode. If the vCPU has not entered the wait mode, the event monitor 402 may keep monitoring the signal 228 from the device 202 in the step 602.

In step 606, the wait optimizer 214 may determine if the wait counter 406 is equal to a threshold value. For example, the threshold value may be a value programmed in the time window register 218. In some implementations, an initial value for the wait counter 406 may be the same as the value programmed in the time window register 218. Thus, if the wait counter 406 is equal to the threshold value when the vCPU enters the wait mode, it may be an indication that the current entry is the first entry to the wait mode for the given vCPU. If the wait counter 406 is not equal to the threshold value, it may be an indication that the current entry is not the first entry. In this case, the wait counter may continue to count until it reaches the threshold value such that any false wakeups within this window of time are avoided. The wait optimizer 214 may not record the time stamp and the lock address for additional entries (e.g., second, third, etc.) of the given vCPU into the wait mode within the given vCPUs' window of time. As shown in FIG. 6, if the wait counter 406 is not equal to the threshold value, the process flow will jump to steps 612 and 614.

In step 608, if the wait counter 406 is equal to the threshold value, the wait optimizer 214 may record a time stamp and a lock address. Since the default value for the wait counter 406 is the same as the value programmed in the time window register 218, a time stamp and the lock address of the first entry into the wait mode may be recorded. Referring back to FIG. 4, the timestamp recorder 408 may record the time stamp in the first entry time register 222 using the clock source via the signal 234. The lock address recorder 410 may record the lock address in the lock address register 224. The lock address recorded in the lock address register 224 together with the time stamp for the first entry recorded in the first entry time register 222 may be used by the hypervisor 208 to order the wake ups and scheduling of the corresponding vCPUs in the order they initially entered the wait mode.

In step 610, the wait optimizer 214 may initialize the wait counter 406 to a first value. In some implementations, the first value may be zero so that the wait counter 406 can count up until it reaches the threshold value to allow waiting for the window of time to avoid any false wake ups. For example, the window of time may correspond to one thousand cycles or any suitable value.

In step 612, the wait optimizer 214 may count the wait counter 406 to a next value and jump back to the step 606 to determine if the wait counter 406 is equal to the threshold value. If the wait counter 406 is not equal to the threshold value, it will continue counting until the wait counter 406 is equal to the threshold value, without recording the time stamp and the lock address, and without initializing the wait counter again.

In step 614, the wait optimizer 214 may initialize a timer to a second value. As discussed with reference to FIG. 4, the timer 404 may be used to introduce an amount of delay programmed in the delay register 216 once the vCPU enters the wait mode. In one implementation, the second value may be zero. Note that the steps 612 and 614 may execute in parallel.

In step 616, the wait optimizer 214 may determine if the vCPU is still in the wait mode. For example, in some instances, the vCPU may exit the wait mode due to an external event. In such cases, the additional delay may not be introduced using the timer 404, and the wait optimizer 214 may go back to step 602 to monitor the signal 228 from the device 202 to determine the next entry of the vCPU into the wait mode. Note that the wait counter 406 may continue to count until it reaches the threshold value. Once the wait counter 406 reaches the threshold value, a next entry of the vCPU into the wait mode may be considered the first entry and a corresponding time stamp and lock address may be recorded in step 608.

In step 618, if the vCPU is still in the wait mode, the timer 404 may count to the next value.

In step 620, the wait optimizer 214 may determine if the timer 404 has reached a predetermined value. For example, the predetermined value may be the value programmed in the delay register 216. If the timer 404 has not reached the predetermined value, the wait optimizer 214 may go back to the step 616 to continue counting the timer 404 to the next value while the vCPU is still in the wait mode and until the timer 404 reaches the predetermined value.

In step 622, if the timer 404 has reached the predetermined value, the wait optimizer 214 may send an event signal to the device 202. The wait optimizer 214 may go back to step 602 to monitor the signal 228 from the device 202 to determine the next entry of the vCPU into the wait mode. As discussed with reference to FIG. 4, the event signal generator 412 may send the event signal 230 which can be used by the interrupt distributor 226 to send an interrupt to the hypervisor 208. The hypervisor 208 can read the first entry time register 222 and the lock address register 224 so that the scheduler 208*a* can make a scheduling decision to execute the vCPUs in the order they first entered the wait mode.

Figure 7:
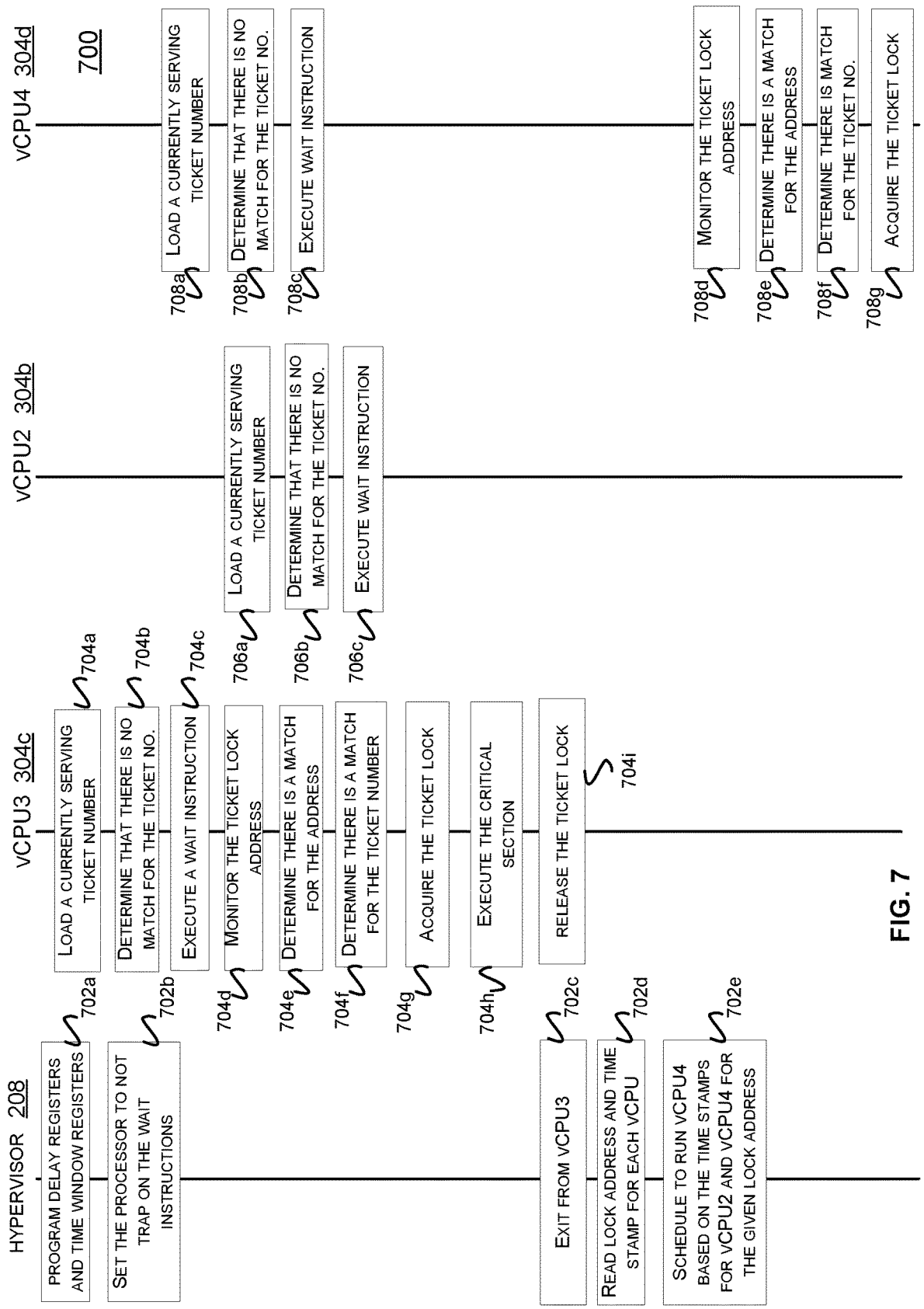
FIG. 7 illustrates flow charts executed by a hypervisor, and a set of vCPUs contending for a ticket lock, in one embodiment.

FIG. 7 illustrates methods 700 executed by the hypervisor 208, and a set of vCPUs contending for a ticket lock, in one embodiment. For example, the set of vCPUs may include the vCPU2 304*b*, vCPU3 304*c* and the vCPU4 304*d*, as discussed with reference to FIG. 2. Note that the set may also include the vCPU1 304*a* and any other vCPUs which are not shown here for the simplicity of illustration. It will be understood that two or more steps shown in the methods 700 may be executed in parallel or in different order than shown in FIG. 7, without deviating from the scope of the disclosed technologies.

In step 702*a*, the hypervisor 208 may program the delay registers and the window registers associated with the set of vCPUs. As discussed with reference to FIG. 4, the hypervisor 208 may program the delay register 216 and the time window register 218 with the appropriate values for each vCPU. The delay and the time window may be the same or different for different vCPUs.

In step 702*b*, the hypervisor 208 may set the device 202 to not trap on the wait instructions. For example, the hypervisor 208 may program the appropriate register(s) so that an exit to an interrupt routine does not occur, when a wait instruction is executed by any of the participating vCPUs. This may minimize the overhead caused by transitioning in and out of the interrupt routine and save CPU cycles which may be used for other useful tasks.

In step 704*a*, the vCPU3 304*c* may load a now serving ticket number as indicated by the owner 300*b*. Assuming that the ticket lock is currently held by the vCPU1 304*a*, as discussed with reference to FIG. 3B in step 302*c*, the vCPU3 304*c* may obtain the next ticket number equal to one as indicated by the next 300*a*.

In step 704*b*, the vCPU3 304*c* may compare its ticket number with the ticket number of the owner 300*b*, which is zero. Thus, the vCPU3 304*c* may determine that there is no match for the ticket number and the attempt to acquire the ticket lock has failed.

In step 704*c*, the vCPU3 304*c* may execute a wait instruction to enter the wait mode while the ticket lock is busy. For example, the wait instruction may include a WFE, MWAIT, or any similar instruction based on the instruction set architecture of the device 202. Executing the wait instruction by the vCPU3 304*c* may send an indication to the wait optimizer 214 via the signal 228 that the vCPU3 304*c* has entered the wait mode. The wait optimizer 214 may determine that the entry of the vCPU3 304*c* into the wait mode is the first entry and may record a timestamp and the ticket lock address into the first entry time register 222 and the lock address register 224 for the vCPU3 304*c*.

In step 704*d*, the vCPU3 304*c* may monitor the ticket lock address to determine when the ticket lock is available. For example, the ticket lock address may be stored in a monitor as discussed previously.

In step 704*e*, the vCPU3 304*c* may determine that there is a match for the ticket lock address. For example, the ticket lock may be released by the vCPU1 304*a*.

In step 704*f*, the vCPU3 304*c* may compare its ticket number with the next ticket number and determine that there is a match for the ticket number. For example, once the vCPU1 304*a* releases the ticket lock, the owner 300*a* may be incremented by one which will match with the ticket number of the vCPU3 304*c*.

In step 704*g*, the vCPU3 304*c* may acquire the ticket lock since the ticket number of the vCPU3 304*c* matches with the now serving ticket number.

In step 704*h*, the vCPU3 304*c* may execute the critical section after acquiring the ticket lock.

In step 708*a*, the vCPU4 304*d* may load a now serving ticket number as indicated by the owner 300*b*. Since the ticket lock is currently held by the vCPU1 304*a*, the vCPU3 304*c* may obtain the next ticket number equal to two.

In step 708*b*, the vCPU4 304*d* may compare its ticket number with the ticket number of the owner which is zero. Thus, the vCPU3 304*c* may determine that there is no match for the ticket number and the attempt to acquire the ticket lock has failed.

In step 708*c*, the vCPU4 304*d* may execute a wait instruction to enter the wait mode while the ticket lock is busy. For example, the wait instruction may include a WFE, MWAIT, or any similar instruction based on the instruction set architecture of the device 202. Executing the wait instruction by the vCPU4 304*d* may send an indication to the wait optimizer 214 via the signal 228 that the vCPU3 304*c* has entered the wait mode. The wait optimizer 214 may determine that the entry of the vCPU4 304*d* into the wait mode is the first entry and may record a timestamp and the ticket lock address into the first entry time register 222 and the lock address register 224 for the vCPU4 304*d*.

In step 706*a*, the vCPU2 304*b* may load a currently serving ticket number. Since the ticket lock is currently held by the vCPU1 304*a*, the vCPU2 304*b* may obtain the next ticket number equal to three.

In step 706*b*, the vCPU2 304*b* may compare its ticket number with the ticket number of the owner which is zero. Thus, the vCPU2 304*b* may determine that there is no match for the ticket number and the attempt to acquire the ticket lock has failed.

In step 706*c*, the vCPU2 304*b* may execute a wait instruction to enter the wait mode while the ticket lock is busy. For example, the wait instruction may include a WFE, MWAIT, or any similar instruction based on the instruction set architecture of the device 202. Executing the wait instruction by the vCPU2 304b may send an indication to the wait optimizer 214 via the signal 228 that the vCPU2 304b has entered the wait mode. The wait optimizer 214 may determine that the entry of the vCPU2 304b into the wait mode is the first entry and may record a timestamp and the ticket lock address into the first entry time register 222 and the lock address register 224 for the vCPU2 304b.

In step 704i, the vCPU3 304c may release the ticket lock after finishing the execution of the critical section. Once the vCPU3 304c releases the ticket lock, the owner 300a may be incremented to two.

In step 702c, the hypervisor 208 may exit from the vCPU3304c once the vCPU3 304c releases the ticket lock after finishing the execution of the critical section.

In step 702d, the hypervisor 208 may read the first entry time register 222 and the lock address register 224 to read the time stamp for each vCPU contending for the ticket lock with the lock address in the lock address register 224 to determine which vCPU first entered the wait mode.

In step 702d, the hypervisor 208 may schedule to run the vCPU4 304d based on the time stamps recorded for the vCPU2 304b and the vCPU4 304d in the first entry time register 222 for the lock address in the lock address register 224.

In step 708d, the vCPU4 304d may monitor the ticket lock address to determine when the ticket lock is available.

In step 708e, the vCPU4 304d may determine that there is a match for the ticket lock address since the ticket lock has been released by the vCPU3 304c.

In step 708f, the vCPU4 304d may compare its ticket number with the next ticket number and determine that there is a match for the ticket number. For example, the owner ticket number may indicate two, which will match with the ticket number of the vCPU4 304d.

In step 708g, the vCPU4 304d may acquire the ticket lock since the ticket number of the vCPU4 304d matches with the now serving ticket number.

Once the vCPU4 304d finishes executing the critical section, the hypervisor 208 may schedule to execute vCPU2 304b based on the time stamp associated with the vCPU2 304b.

As discussed with reference to FIGS. 1-7, some embodiments of the disclosed technologies can allow a vCPU to achieve higher performance by waiting a little longer after entering the wait mode to avoid an exit to the hypervisor. Introducing a certain amount of delay while in the wait mode can improve the chances of acquiring the lock, thus resulting in faster execution by avoiding the exit to the hypervisor as well as saving power by staying in the low power state for little longer. Recording the time stamps only for the respective first entries of the vCPUs within their respective window of time can allow maintaining the order of execution by the hypervisor in which the vCPUs initially entered the wait mode.

Figure 8:
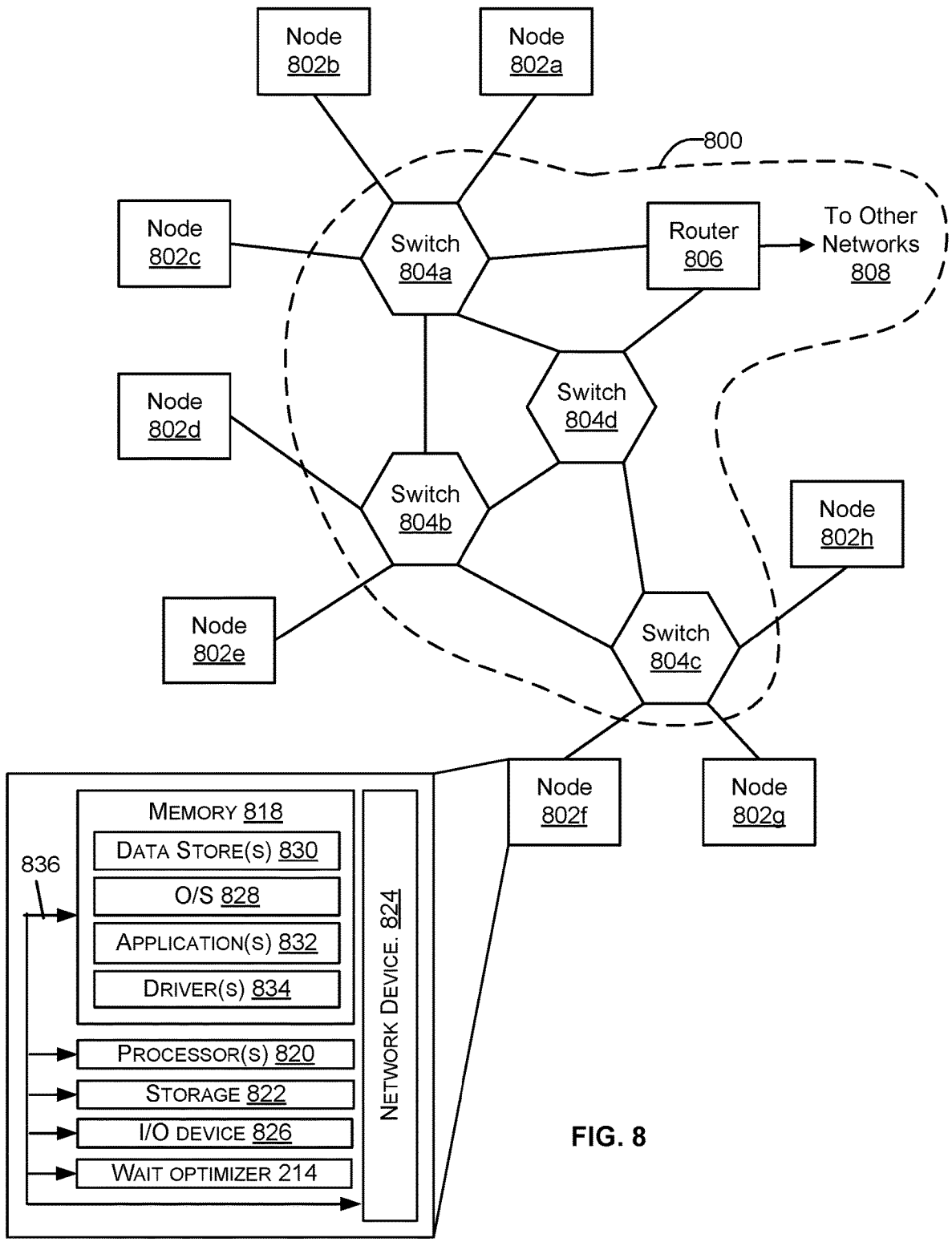
FIG. 8 illustrates an example architecture for features and systems described herein that includes one or more service provider computers and/or a user device connected via one or more networks, according to certain aspects of the disclosure.

FIG. 8 illustrates a network 800, illustrating various different types of nodes. Functionality and/or several components described with reference to FIG. 8 may be used without limitation with other embodiments disclosed elsewhere in this disclosure, without limitations. In certain embodiments, the network 800 may be based on a switched architecture with point-to-point links. As illustrated in FIG. 8, the network 800 includes a plurality of switches 804a-804d, which may be arranged in a network. In some cases, the switches are arranged in a multi-layered network, such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804a-804d may be connected to a plurality of nodes 802a-802h and provide multiple paths between any two nodes.

The network 800 may also include one or more devices for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804a-804d and router 806, if present, may be referred to as a switch fabric, a fabric, a network fabric, or simply a network. In the context of a computer network, terms "fabric" and "network" may be used interchangeably herein.

Nodes 802a-802h may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described. The instructions executed by the processor(s) 820 may be stored on a computer-readable storage medium, for example, in the form of a computer program. The computer-readable storage medium may be non-transitory. In some cases, the computer-readable medium may be part of the memory 818.

In some instances, the hardware processor(s) 820 may be a single core processor or a multi-core processor. A multi-core processor may include multiple processing units within the same processor. Examples of processor(s) 820 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 820, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 820 may include permanent or transitory data used and/or operated on by the operating system 828, application programs 832, or drivers 834. Examples of such data include web pages, video data, audio data, images, user data, and so on. The information in the data stores 820 may, in some implementations, be provided over the network(s) 808 to user devices 804. In some cases, the data stores 820 may additionally or alternatively include stored application programs and/or drivers. Alternatively or additionally, the data stores 820 may store standard and/or proprietary software libraries, and/or standard and/or proprietary application user interface (API) libraries. Information stored in the data stores 820 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

Each of the node(s) 802a-802h may also include a respective wait optimizer 214 to provide wait optimization for vCPUs executing on the processor(s) 820, as discussed with reference to FIGS. 1-7. For example, the processor(s) 820 may be similar to the processor 210.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computing system comprising:
   a processor configured to execute instructions for a hypervisor and a set of virtual CPUs (vCPUs);
   a processing circuit external to the processor and coupled to the processor, wherein the processing circuit is configured to:
   monitor a signal from the processor to detect a first entry of a respective vCPU of the set of vCPUs into a respective wait mode from a plurality of entries of the respective vCPU into the respective wait mode within a respective window of time for the respective vCPU while the respective vCPU is waiting to acquire a ticket lock held by another vCPU of the set of vCPUs, the respective window of time for the respective vCPU being initiated by the first entry of the respective vCPU into the respective wait mode, wherein subsequent entries of the plurality of entries of the respective vCPU into the respective wait mode after the first entry are caused by false wake ups;
   record a time stamp and a ticket lock address associated with the respective vCPU upon only the first entry of the respective vCPU into the respective wait mode within the respective window of time;
   while the respective vCPU is waiting to acquire the ticket lock in the respective wait mode, count using a respective timer until the respective timer reaches a respective predetermined value determined by the hypervisor; and
   upon the respective timer reaching the respective predetermined value, send an event signal to the processor to wake up the respective vCPU to compare a first value stored at the ticket lock address with a second value stored in a memory, wherein the first value indicates a now serving ticket number and the second value indicates a ticket number of the respective vCPU, and wherein the respective vCPU acquires the ticket lock when the first value matches the second value stored in the memory.

2. The computing system of claim 1, wherein the processing circuit is further configured to:
   start a wait counter when the respective window of time is initiated and end the respective window of time when the wait counter reaches a value equal to a threshold value for the respective window of time.

3. The computing system of claim 1, wherein the respective window of time has a duration sufficient for each vCPU of the set of vCPUs contending for a same ticket lock to acquire the same ticket lock.

4. The computing system of claim 1, wherein the respective value for the respective timer is programmed in a delay register of the processing circuit by the hypervisor.

5. The computing system of claim 1, wherein the hypervisor is configured to schedule each vCPU from the vCPUs to execute in an order based on an earliest time stamp associated with each vCPU from the set of vCPUs.

6. The computing system of claim 1, wherein the processing circuit is further configured to:
   prior to recording the time stamp, determine the first entry of the respective vCPU based on a number of cycles that have passed between detecting a previous entry of the respective vCPU into the respective wait mode and a given entry of the respective vCPU into the respective wait mode.

7. The computing system of claim 1, wherein the processing circuit is further configured to:
   prior to recording the time stamp, determine the first entry of the respective vCPU based on a number of instructions that have been executed between detecting a previous entry of the respective vCPU into the respective wait mode and a given entry of the respective vCPU into the respective wait mode.

8. The computing system of claim 1, wherein the respective vCPU is configured to, after being woken up, monitor the ticket lock address associated with the respective vCPU to determine if the ticket lock is available.

9. A method, comprising:
   executing, by a processor, instructions for a hypervisor and a set of virtual CPUs (vCPUs);
   monitoring, by a processing circuit external to the processor and coupled to the processor, a signal from the processor to detect a first entry of a respective vCPU of the set of vCPUs into a respective wait mode from a plurality of entries of the respective vCPU into the respective wait mode within a respective window of time for the respective vCPU while the respective vCPU is waiting to acquire a ticket lock held by another vCPU of the set of vCPUs, the respective window of time for the respective vCPU being initiated by the first entry of the respective vCPU into the respective wait mode, wherein subsequent entries of the plurality of entries of the respective vCPU into the respective wait mode after the first entry are caused by false wake ups;
   recording, by the processing circuit, a time stamp and a ticket lock address associated with the respective vCPU upon only the first entry of the respective vCPU into the respective wait mode within the respective window of time;
   while the respective vCPU is waiting to acquire the ticket lock in the respective wait mode, counting, by the processing circuit, using a respective timer until the respective timer reaches a respective predetermined value determined by the hypervisor; and upon the respective timer reaching the respective predetermined value, sending an event signal by the processing circuit to the processor to wake up the respective vCPU to compare a first value stored at the ticket lock address with a second value stored in a memory, wherein the first value indicates a now serving ticket number and the second value indicates a ticket number of the respective vCPU, and wherein the respective vCPU acquires the ticket lock when the first value matches the second value stored in the memory.

10. The method of claim 9, further comprising:

starting a wait counter by the processing circuit when the respective window of time is initiated and ending the respective window of time when the wait counter reaches a value equal to a threshold value for the respective window of time.

11. The method of claim 9, further comprising:

scheduling, by the hypervisor, each vCPU from the vCPUs to execute in an order based on an earliest time stamp associated with each vCPU from the set of vCPUs.

12. The method of claim 9, further comprising:

prior to recording the time stamp, determining, by the processing circuit, the first entry of the respective vCPU based on a number of cycles that have passed between detecting a previous entry of the respective vCPU into the respective wait mode and a given entry of the respective vCPU into the respective wait mode.

13. The method of claim 9, further comprising:

prior to recording the time stamp, determining, by the processing circuit, the first entry of the respective vCPU based on a number of instructions that have been executed between detecting a previous entry of the respective vCPU into the respective wait mode and a given entry of the respective vCPU into the respective wait mode.

14. The method of claim 9, wherein the respective window of time for the respective vCPU has a duration sufficient for each vCPU of the set of vCPUs contending for a same ticket lock to acquire the same ticket lock.

15. An integrated circuit, comprising:

an event monitor circuit configured to monitor a signal from a host processor external to the integrated circuit to detect an entry of a given vCPU of a set of vCPUs executing on the host processor into a wait mode to acquire a ticket lock held by another vCPU of the set of vCPUs;

a delay register circuit configured to store a value corresponding to an amount of delay to introduce when the given vCPU of the set of vCPUs enters the wait mode;

a time window register circuit configured to provide a respective window of time for the given vCPU, during which subsequent entries into the wait mode by the given vCPU after a first entry of the given vCPU into the wait mode are ignored, wherein the subsequent entries into the wait mode by the given vCPU after the first entry of the given vCPU into the wait mode are caused by false wake ups;

a first entry time register circuit configured to record a time stamp corresponding to only the first entry of the given vCPU into the wait mode within the respective window of time for the given vCPU;

a lock address register circuit configured to store a ticket lock address of the ticket lock that is contended for by the set of vCPUs; and a timer circuit configured to, while the given vCPU is waiting to acquire the ticket lock in the wait mode, count until a counter value of the timer circuit reaches the value stored in the delay register circuit, wherein the integrated circuit is configured to, upon the counter value of the timer circuit reaches the value stored in the delay register circuit, send an event signal to the host processor to wake up the given vCPU to compare a first value stored at the ticket lock address with a second value stored in a memory, wherein the first value indicates a now serving ticket number and the second value indicates a ticket number of the given vCPU, and wherein the given vCPU acquires the ticket lock when the first value matches the second value stored in the memory.

16. The integrated circuit of claim 15, wherein the given vCPU enters the wait mode to wait for the ticket lock to be available before executing a predetermined section of a computer program.

17. The integrated circuit of claim 15, wherein a wake-up order of the given vCPU is determined based on the ticket lock address stored in the lock address register circuit and the time stamp recorded in the first entry time register circuit.

18. The integrated circuit of claim 15, further comprising:

an interrupt distributor circuit configured to generate an interrupt to the host processor upon receipt of the event signal; and an event signal generator circuit configured to generate the event signal to the interrupt distributor circuit when the counter value of the timer circuit reaches the value stored in the delay register circuit.

19. The integrated circuit of claim 18, wherein the respective window of time for the given vCPU has a duration sufficient for each vCPU of the set of vCPUs contending for a same ticket lock to acquire the same ticket lock.

20. The integrated circuit of claim 18, wherein the event signal includes information indicating a source instruction executed by the given vCPU to enter the wait mode.

* * * * *